March 11, 1952
C. W. SINCLAIR
2,588,665
BRAKE DRUM
Filed March 15, 1948
4 Sheets-Sheet 1
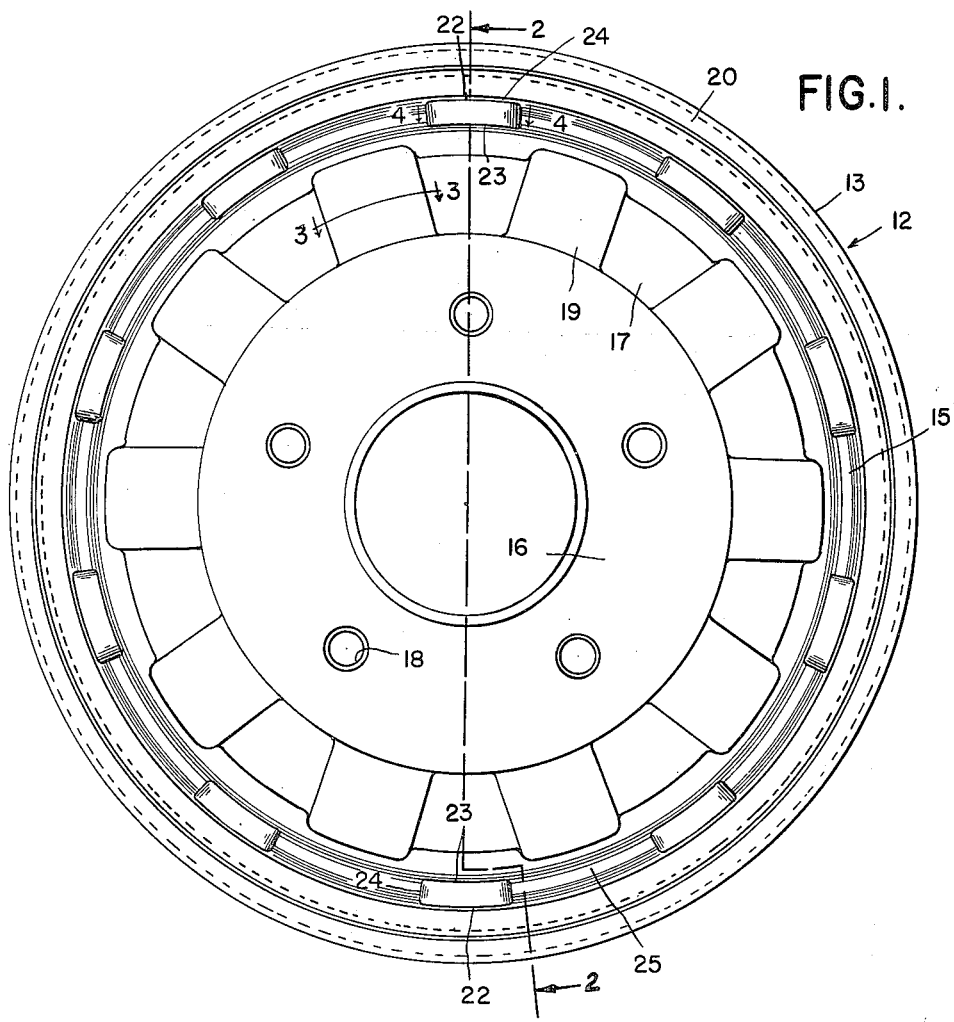
FIG.1.
FIG.4.  FIG.3.
INVENTOR.
CHARLES W. SINCLAIR
BY 
ATTORNEYS March 11, 1952  C. W. SINCLAIR  2,588,665
BRAKE DRUM Filed March 15, 1948  4 Sheets-Sheet 2

INVENTOR.
CHARLES W. SINCLAIR
BY
ATTORNEYS

March 11, 1952 C. W. SINCLAIR 2,588,665
BRAKE DRUM
Filed March 15, 1948 4 Sheets-Sheet 3
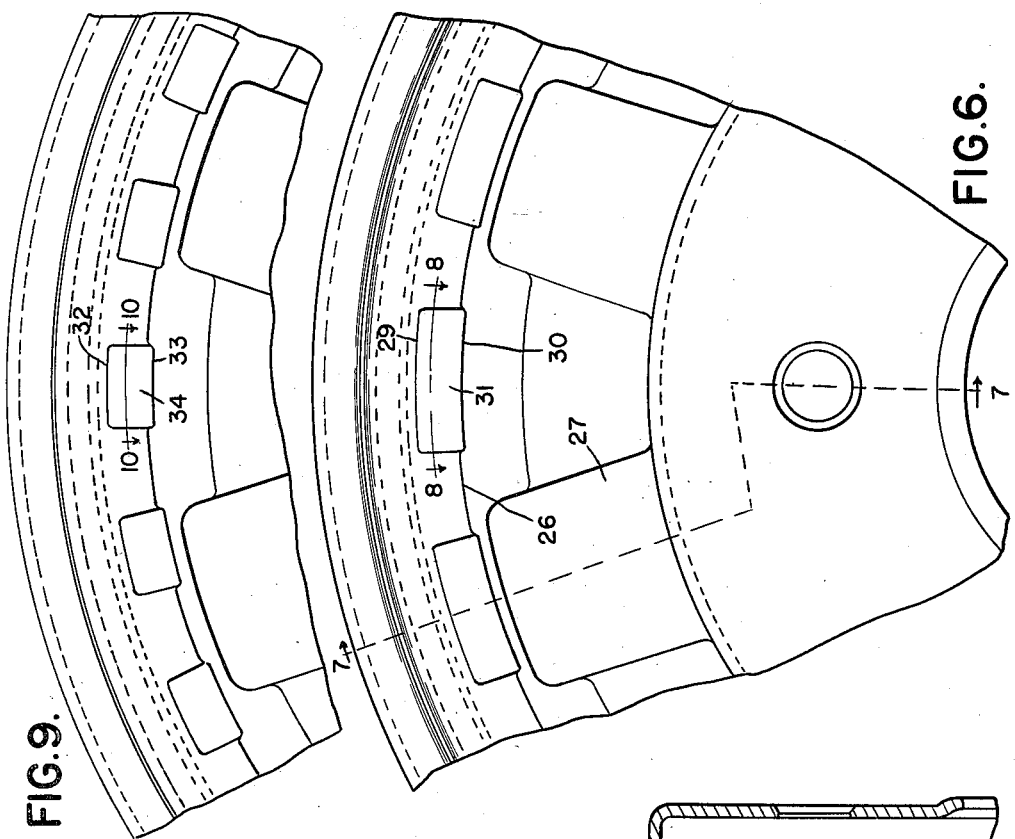
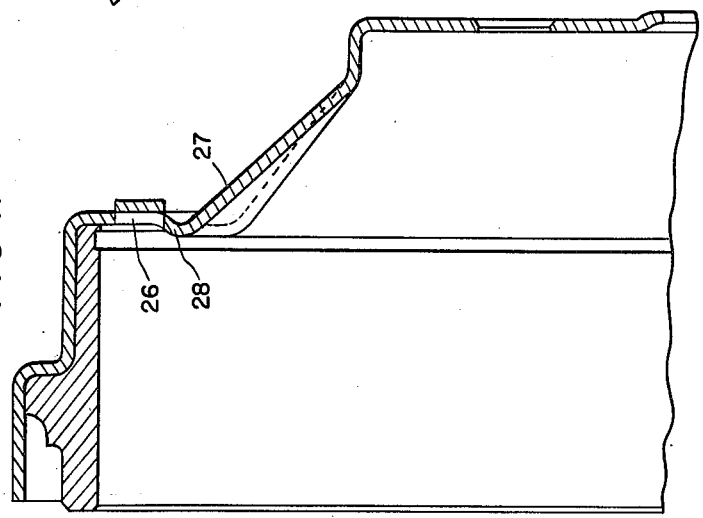
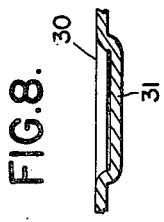
INVENTOR.
CHARLES W. SINCLAIR
BY
ATTORNEYS March 11, 1952
C. W. SINCLAIR
2,588,665
BRAKE DRUM
Filed March 15, 1948
4 Sheets-Sheet 4
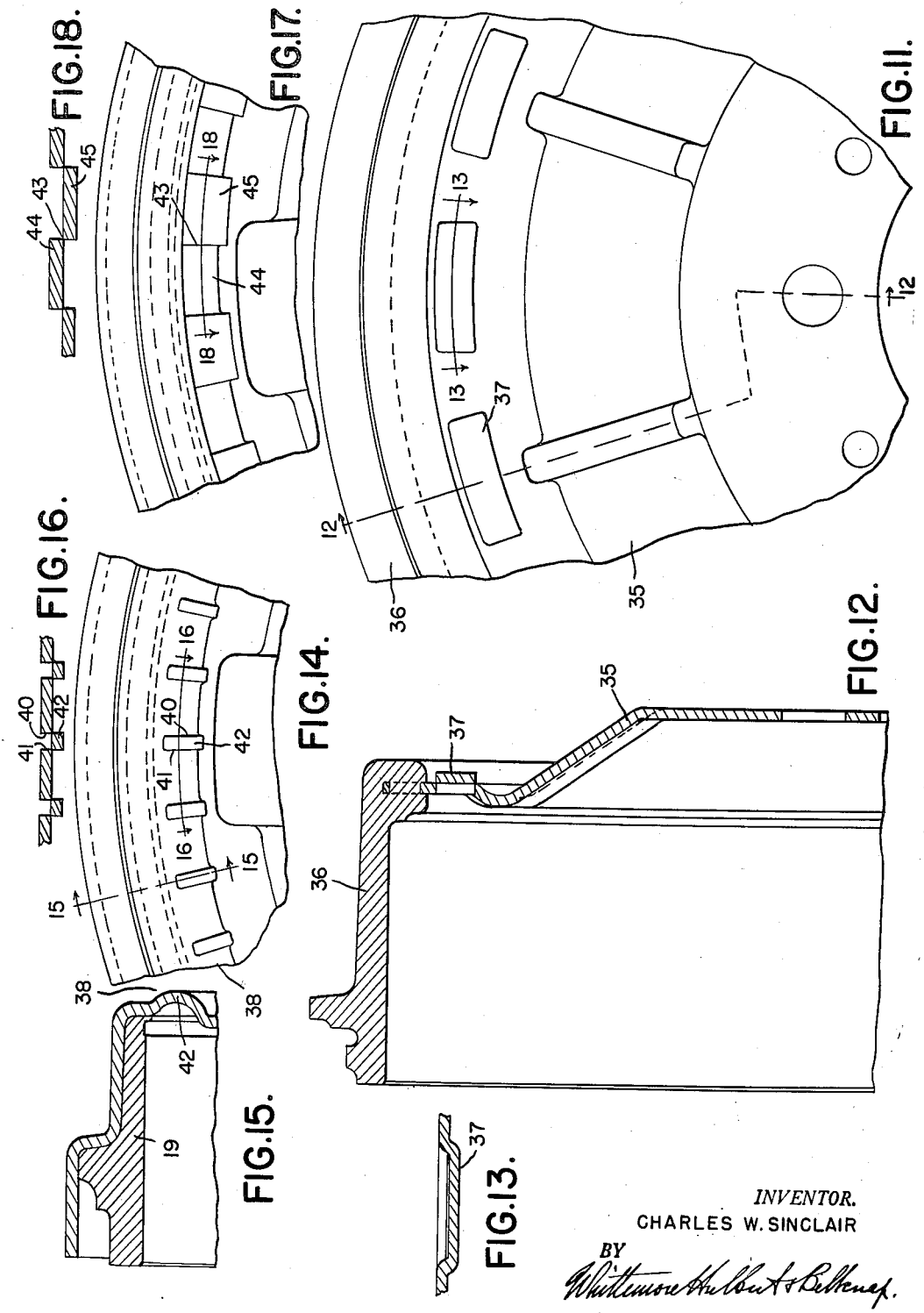
INVENTOR.
CHARLES W. SINCLAIR
BY
ATTORNEYS

Patented Mar. 11, 1952

2,588,665

UNITED STATES PATENT OFFICE 2,588,665

BRAKE DRUM

Charles W. Sinclair, Detroit, Mich., assignor to Kelsey-Hayes Wheel Company, Detroit, Mich., a corporation of Delaware Application March 15, 1948, Serial No. 14,900

4 Claims. (Cl. 188—218)

The invention relates to brake drums and refers more particularly to brake drums of that type in which the back and annular brake engaging member are permanently secured together.

The invention has for one of its objects to provide an improved brake drum in which the back is constructed to break up the transmission of sound vibrations from the brake engaging member to the central portion of the back.

The invention has for another object to provide an improved brake drum in which the back is formed to expand radially as well as to arrest sound.

With these and other objects in view, the invention resides in the novel features of construction and combinations and arrangements of parts as more fully hereinafter set forth.

In the drawings:

Figure 1 is a slide elevation of a portion of a brake drum embodying the invention;

Figures 2, 3 and 4 are cross-sections on the lines 2—2, 3—3, and 4—4 respectively of Figure 1;

Figure 6 is a view similar to Figure 1 showing another construction of brake drum;

Figure 2:
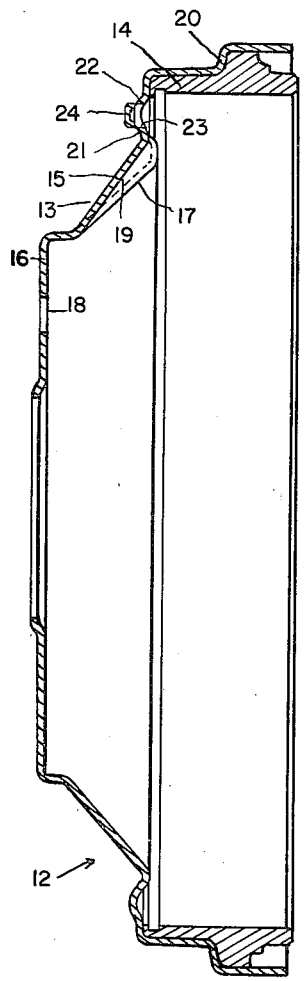

Figures 7 and 8 are cross-sections on the lines 7—7 and 8—8 respectively of Figure 6;

Figure 9 is a view similar to Figure 1 illustrating a modified construction of brake drum;

Figure 10 is a cross-section on the line 10—10 of Figure 9;

Figure 11 is a view similar to Figure 1 showing another modified construction of brake drum;

Figures 12 and 13 are cross-sections on the lines 12—12 and 13—13 respectively of Figure 11;

Figure 14 is a view similar to Figure 1 showing another modified construction of brake drum;

Figures 15 and 16 are cross-sections on the lines 15—15 and 16—16 respectively of Figure 14;

Figure 17 is a view similar to Figure 1 showing another modified construction of brake drum;

Figure 18 is a cross-section on the line 18—18 of Figure 17.

Figures 1-4 inclusive illustrate the brake drum 12 of a motor vehicle wheel brake comprising the sheet metal shell 13 and the annular cast brake engaging member 14, the internal cylindrical face of which is engageable by brake shoes. The shell has the back 15 which is formed with the central radially extending bolting-on portion 16 and the reinforced portion 17 flaring from the bolting-on portion. The bolting-on portion is provided with the annular series of holes 18 for receiving means, such as bolts, for securing the shell to the fixed flange of a wheel hub to which the wheel is also secured. The reinforced portion is provided with the ribs 19 progressively increasing in depth radially outwardly. The shell also has the integral annular flange 20. The brake engaging member is a ring preferably centrifugally cast within the annular flange 20 and fused or bonded thereto as well as to the peripheral portion of the back.

For the purpose of breaking up the transmission of sound vibrations from the brake engaging member 14 to the central portion of the back 15 and thereby arresting sound when the brake shoes are applied against the internal friction face of the brake engaging member, the back is formed with the annular slitted portion 21 radially inwardly of and adjacent to the brake engaging member and radially outwardly of the reinforced portion 17. The annular slitted portion is radially arcuate to form in effect an annular bead and has the annular series of angularly spaced circumferentially extending slits 22 and 23 formed by a shearing operation with the slits arranged in pairs and the pairs equally spaced. The slits 23 are spaced radially inwardly from and opposite the slits 22, the parts 24 between the slits of each pair being integrally connected at their circumferential ends with the parts 25 intermediate the pairs of slits. The parts 24 are also axially offset or depressed from these intermediate parts but have their edges at the slits in close proximity to the parts at the opposite sides of the slits to thereby substantially close the back. During the shearing operation the parts 24 are flattened by the punches and dies used in effecting the shearing.

Figure 5:
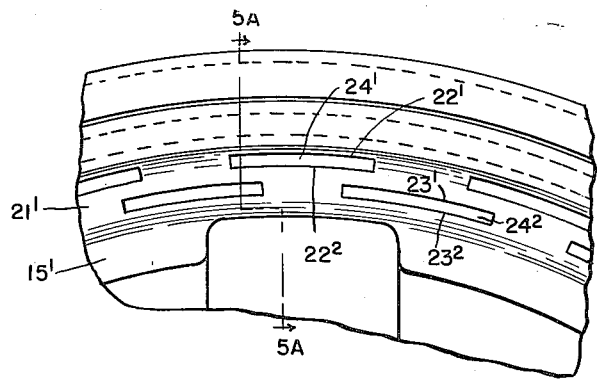
Figure 5 is a view similar to Figure 1 showing a modified construction of brake drum.
Figure 5A:
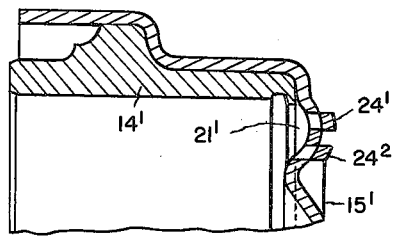
Figure 5A is a cross section on the line 5A—5A of Figure 5.

In the construction of brake drum illustrated in Figures 5 and 5A the back 15' radially inwardly of the cast brake engaging member 14' has the annular radially arcuate portion 21' which is formed with the annular series of pairs of circumferentially extending slits 22' and $22^2$ and 23' and $23^2$ with the pairs staggered. The inner series of pairs of slits 23' and $23^2$ are spaced radially inwardly from the outer series of pairs of slits 22' and $22^2$ and the slits 23' and $23^2$ extended circumferentially past the ends of the adjacent slits 22' and $22^2$. Furthermore, the parts 24' and $24^2$ between the pairs of slits 22' and $22^2$ and 23' and $23^2$ respectively are axially offset in an outboard direction but are so positioned that the slits are substantially closed.

In this modified construction of brake drum the slits in addition to braking up the transmission of sound vibrations to arrest sound, also provide for radial expansion of the annular portion of the brake drum back so that during operation of the brake drum the inner portion of the brake engaging member near the back may radially expand to assist in maintaining the inner friction face of the brake engaging member in the desired substantially axial relation.

Figures 6, 7 and 8 illustrate a modification of brake drum with the same general construction as that of Figures 1-4 inclusive with the exception that the annular slitted portion 26 extends radially instead of being radially arcuate and connects into the flared reinforced portion 27 of the back by means of the return-bent portion 28. Also the annular slitted portion has a greater number of equally spaced pairs of circumferentially extending slits 29 and 30 with the depressed parts 31 between the slits of each pair also extending radially.

As illustrated in Figures 9 and 10 the brake drum has a still greater number of equally spaced pairs of circumferentially extending slits 32 and 33 and depressions 34 between the slits of each pair.

Figures 11, 12 and 13 illustrate another construction of brake drum comprising the sheet metal back 35 and the annular cast brake engaging member 36 which is cast directly on and fused to the periphery of the back. In this construction, the portion of the back radially within the flange of the brake engaging member is slitted circumferentially and the depressed or axially offset parts 37 between the slits of each pair also extend in close proximity to the parts of the back at the radially opposite sides of the slits.

The brake drum illustrated in Figures 14, 15 and 16 has its annular portion 38 radially within and spaced from the cast brake engaging member 39 formed with the equally spaced pairs of substantially radial slits 40 and 41, the parts or arms 42 between the slits of each pair being depressed or axially offset in an outboard direction and being arcuate. However, these parts at their points of greatest offset lie in close proximity to the parts or arms at the circumferentially opposite sides of the slits so that the slits are substantially closed.

Figures 17 and 18 show the same general construction of brake drum in which the slits 43 extend truly radially and are equally spaced circumferentially of the back. In this structure the alternate parts or arms 44 and 45 between the slits are relatively axially offset preferably by depressing the parts 45.

What I claim as my invention is:

1. A brake drum comprising an annular brake engaging member and a back secured to said brake engaging member and having an annular bead radially inwardly of said brake engaging member provided with angularly spaced circumferentially extending slits with the parts between adjacent slits axially offset and having their edges at the adjacent slits spaced from and in close proximity to the parts at the opposite sides of the adjacent slits.

2. A brake drum comprising a sheet metal shell having a back and an integral annular flange at the periphery of said back and a cast brake engaging ring within and fused to said flange, said back having an annular bead radially inwardly of said brake engaging ring provided with radially spaced circumferentially extending slits arranged in pairs with the parts between the slits of each pair axially offset and having their edges at the slits spaced from and in close proximity to the parts at the opposite sides of the slits.

3. A brake drum comprising an annular brake engaging member and a back secured to said brake engaging member and having an annular bead radially inwardly of said brake engaging member provided with angularly spaced circumferentially extending slits arranged in pairs with the parts between the slits of each pair axially offset and having their edges at the slits spaced from and in close proximity to the parts at the opposite sides of the slits.

4. A brake drum comprising a back and an annular brake engaging member on said back, said back having an annular portion radially inwardly of said brake engaging member provided with angularly spaced circumferentially extending slits arranged in pairs with the parts between the slits of each pair axially offset and having their edges at the slits in close proximity to the parts at the opposite sides of the slits.

CHARLES W. SINCLAIR.

REFERENCES CITED

The following references are of record in the file of this patent:

UNITED STATES PATENTS

| Number | Name | Date |
|---|---|---|
| 1,745,301 | Johnston | Jan. 28, 1930 |
| 1,944,261 | Mulhern | Jan. 23, 1934 |
| 2,080,895 | Nelson | May 18, 1937 |
| 2,087,907 | Gottlieb et al. | July 27, 1937 |
| 2,088,191 | Eksergian | July 27, 1937 |
| 2,097,125 | Le Jeune | Oct. 26, 1937 |

FOREIGN PATENTS

| Number | Country | Date |
|---|---|---|
| 387,933 | Great Britain | Feb. 16, 1933 |